(12) United States Patent
Sulzer et al.

(10) Patent No.: US 10,619,771 B2
(45) Date of Patent: Apr. 14, 2020

(54) HYBRID FLANGE

(71) Applicant: Endress+Hauser GmbH+Co. KG, Maulburg (DE)

(72) Inventors: Thomas Sulzer, Basel (CH); Peter Seefeld, Bad Wimpfen (DE); Ulrich Kaiser, Basel (CH); Sergej Lopatin, Lörrach (DE); Christof Huber, Bern (CH); Peter Klöfer, Steinen (DE); Mike Touzin, Höllstein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 79 days.

(21) Appl. No.: 15/518,793

(22) PCT Filed: Sep. 17, 2015

(86) PCT No.: PCT/EP2015/071275
§ 371 (c)(1),
(2) Date: Apr. 13, 2017

(87) PCT Pub. No.: WO2016/058777
PCT Pub. Date: Apr. 21, 2016

(65) Prior Publication Data
US 2017/0234467 A1  Aug. 17, 2017

(30) Foreign Application Priority Data
Oct. 15, 2014  (DE) .................. 10 2014 114 941

(51) Int. Cl.
*F16L 23/032* (2006.01)
*G01F 23/00* (2006.01)
(Continued)

(52) U.S. Cl.
CPC .............. *F16L 23/032* (2013.01); *G01F 1/00* (2013.01); *G01F 15/00* (2013.01); *G01F 15/14* (2013.01);
(Continued)

(58) Field of Classification Search
USPC .......... 73/866.5, 53.01, 54.01; 374/145, 146, 374/208; 285/55, 363, 412
See application file for complete search history.

(56) References Cited

U.S. PATENT DOCUMENTS 2,837,354 A   6/1958  Thibault et al.
3,899,006 A   8/1975  Champleboux et al.
(Continued)

FOREIGN PATENT DOCUMENTS

CN   1936506 A     3/2007
CN   101124426 A   2/2008
(Continued)

OTHER PUBLICATIONS

International Search Report for Patent Application No. PCT/EP2015/071275, WIPO, dated Dec. 11, 2015, 12 pp.

*Primary Examiner* — John Fitzgerald
*Assistant Examiner* — Truong D Phan
(74) *Attorney, Agent, or Firm* — Christopher R. Powers; PatServe

(57) ABSTRACT

Apparatus for determining and/or monitoring at least one physical or chemical process variable of a medium in a containment comprising at least one sensor element, at least one housing module and at least one flange, wherein the sensor element and the flange are connected with the housing module, wherein the flange in a first portion, which is at least partially media contacting, is manufactured at least partially of a first material, which is selected application specifically, and wherein the flange in a second portion,
(Continued)

which is at least partially environment contacting, is manufactured at least partially of a synthetic material.

19 Claims, 2 Drawing Sheets

(51) Int. Cl.
    *G01F 15/00*         (2006.01)
    *G01F 15/18*         (2006.01)
    *G01F 15/14*         (2006.01)
    *G01F 1/00*          (2006.01)
    *G01N 9/10*          (2006.01)
    *G01N 11/10*         (2006.01)
    *F16L 23/036*       (2006.01)

(52) U.S. Cl.
    CPC ............ *G01F 15/185* (2013.01); *G01F 23/00*
    (2013.01); *G01N 9/10* (2013.01); *G01N 11/10*
    (2013.01); *F16L 23/036* (2013.01)

(56) References Cited

U.S. PATENT DOCUMENTS

| | | |
|---|---|---|
| 4,388,834 A | 6/1983 | Schmoock |
| 5,065,892 A * | 11/1991 | Lukez .................... B65D 90/50 |
| | | 220/320 |
| 5,773,723 A | 6/1998 | Lewis et al. |
| 6,155,112 A * | 12/2000 | Eckert .................... G01F 23/284 |
| | | 73/290 V |
| 6,257,071 B1 | 7/2001 | Dessert et al. |
| 6,361,080 B1 | 3/2002 | Walsh et al. |
| 7,632,565 B1 * | 12/2009 | Imam ....................... B32B 15/02 |
| | | 428/307.3 |
| 9,056,370 B1 * | 6/2015 | Matlack ............. B23K 20/1215 |
| 2004/0200278 A1 * | 10/2004 | Gansebom ............. H01H 36/02 |
| | | 73/305 |
| 2007/0210107 A1 * | 9/2007 | Pleschinger ............. H05B 3/04 |
| | | 222/153.06 |
| 2007/0295102 A1 | 12/2007 | Sulzer et al. |
| 2010/0027757 A1 * | 2/2010 | Luecke .................. A61B 6/035 |
| | | 378/197 |
| 2010/0263761 A1 | 10/2010 | Niccolls et al. |
| 2012/0135221 A1 * | 5/2012 | Weidinger ............ C08J 9/0019 |
| | | 428/304.4 |
| 2012/0179113 A1 * | 7/2012 | Yokota ................ A61M 5/3287 |
| | | 604/239 |
| 2013/0145845 A1 * | 6/2013 | Enquist ................ G01N 21/783 |
| | | 73/431 |
| 2015/0233506 A1 * | 8/2015 | Kim ........................ F16L 21/08 |
| | | 285/337 |

FOREIGN PATENT DOCUMENTS

| | | |
|---|---|---|
| CN | 101490512 A | 7/2009 |
| CN | 103604473 A | 2/2014 |
| DE | 102007037166.9 A1 | 2/2009 |
| EP | 0100579 A1 | 2/1984 |
| EP | 0100580 A1 | 2/1984 |
| WO | 2007126892 A2 | 11/2007 |
| WO | 2009059057 A1 | 5/2009 |

* cited by examiner

HYBRID FLANGE

CROSS-REFERENCE TO RELATED APPLICATIONS

The present application is related to and claims the priority benefit of German Patent Application No. 10 2014 114 941.6, filed on Oct. 15, 2014 and PCT Patent Application No. PCT/EP2015/071275, filed Sep. 17, 2015, the entire contents of which are incorporated herein by reference.

TECHNICAL FIELD

The present disclosure relates to an apparatus for determining and/or monitoring at least one physical or chemical process variable of a medium in a containment.

BACKGROUND

Many such field devices are manufactured and sold by the applicant. The process variable to be determined and/or monitored is, for example, the flow of a fluid through a measuring tube, or the fill level of a medium in a container. It can, however, also be pressure, density, viscosity, conductivity, temperature or pH value. Also known are optical sensors, such as turbidity or absorption sensors.

The establishing of a flange connection between a field device and a containment is a common measure for sealed and releasable connection in industry. Correspondingly, usual containments often have a standardized opening with a counterflange, which is usually directly welded onto the containment. Similarly, the flange is often directly welded to the field device.

The terminology, containment, is meant to include both pipelines as well as also containers, for example, a tank. Field devices, which serve for measuring flow, are usually inserted into an existing pipeline by means of two flange connections. If the fill level in a container is to be determined and/or monitored, then, as a rule, only one flange is required, by means of which the measuring device is mounted on a container having a corresponding counterflange. For example, the counterflange can be in or on a nozzle of the container.

The sensor unit and the flange are usually connected with the at least one housing module in such a manner that during operation of the field device the sensor unit can determine and/or monitor the at least one process variable. Arranged between the housing module and the flange can be a neck tube for temperature isolation. Installation of a field device by means of a flange connection makes sense, as a rule, when the sensor unit, due to the applied measuring principle, must at least partially and at least at times contact the medium. Correspondingly, the arrangement of the at least one flange and the sensor unit with the housing module should assure this. In the case of a fill-level measuring device, for example, it is expedient to have the flange surround the sensor unit in the region, in which the sensor unit is connected with the housing module and, in given cases, protrudes partially inwardly into the housing.

Moreover, associated with the apparatus can be an electronics unit, which can be either in the immediate vicinity of the sensor element or spatially separated therefrom. Thus, the electronics unit is accommodated either in the same housing module as the sensor element or in a separate, second housing module.

In the case of a bolted connection of two flanges, the state of sealing of the flange connection correlates with the compressive pressure of the sealing surfaces of the two flanges on a seal arranged therebetween. The compressive pressure often comes from bolts, which extend through bores in the flange plates. Besides a bolted connection, there are, however, also other methods of connecting two flanges. For example, the two flanges can also be directly welded together.

An especially frequently applied material both for containments as well as also for flanges is stainless steel. However, also other metals, such as, for example, tantalum, Hastelloy or composite materials, e.g. carbon steel, are used for specific applications. In practice, it can be that a flange of metal can contribute up to 50% of the total weight of a field device and up to 30% of the total costs. In the case of rarer and/or more expensive materials, such as tantalum, the percentage costs can be even higher.

Besides metals, applied in industry are, among others, ceramics and synthetic materials, e.g. plastics. Synthetic materials distinguish themselves especially by their lesser weight, their chemical durability and, in many applications, their sufficient thermal durability. Moreover, plastic parts are often more cost effective in comparison with metals.

For some time now, also fiber reinforced plastic flanges are known. Besides the savings in weight and costs, which they offer, also an increased strength and stiffness can result. Moreover, one obtains from a flexible process technology the opportunity to configure such parts suitably for loading by targeted application of their anisotropic properties.

The most important requirements for a flange connection involve assuring a sealed and stable connection. Moreover, the flange should in its region facing the medium not influence the process and/or the medium.

Sealing problems can occur, for instance, when the flange and the containment are manufactured of different materials. Due to different coefficients of thermal expansion, large temperature changes can lead to destruction of the structural integrity of the flange connection.

Similarly, different materials of containment and flange in the media-contacting region can show different reactions with the same medium. For example, an electrochemical reaction can occur due to different redox potentials of two materials.

For these reasons, usually selected for the flange is the same material as the containment. Since containments are predominantly of metal, thus also the flange is predominantly made of heavy and partially more expensive metal, although plastics, fiber reinforced plastics or similar materials would be advantageous as regards weight and cost.

BRIEF SUMMARY

An object of the present disclosure is to provide a cost effective, light flange, which can be used in the case of any containment.

This object is achieved by an apparatus for determining and/or monitoring at least one physical or chemical process variable of a medium in a containment, including at least one sensor element, at least one housing module and at least one flange, wherein the sensor element and the flange are connected with the housing module, wherein the flange in a first portion, which is at least partially media contacting, is manufactured at least partially of a first material, which is selected application specifically and/or customer specifically, and wherein the flange in a second portion, which is at least partially environment contacting, is manufactured at least partially of a synthetic material.

Thus, of concern is a hybrid flange. In the regions, which are at least partially media contacting, the flange is composed of the material, of which the containment is manufactured. Thus, neither disadvantageous effects from contact of at least one of the boundary surfaces of the flange with the medium nor sealing problems due to different coefficients of thermal expansion in the region of the flanged connection can occur. In regions facing away from the medium, in turn, a plastic or composite material or the like can be utilized. Of course, the coefficients of thermal expansion of the first and second portions can be matched to one another. Depending on character of the environment, the synthetic material can also be selected specifically for such. Criteria for the choice can be given, for example, by features such as chemical and/or thermal durability. If such criteria do not need to be fulfilled, an especially favorable polymer can be used, in order to reduce price further.

A flange construction of the present disclosure saves both costs as well as also weight. In spite of this, the flange can be so adapted that it always is composed in the region facing the medium of the same material as the containment.

In a first embodiment, the first portion is a coating or a plating, which is arranged on or at the second portion. The material of the first portion is, thus, freely selectable and can be selected on or at the second portion as a function of the containment, on which the apparatus is to be secured. Advantageous for this embodiment is a so-called modular design principle, in the case of which a core for a flange in the different sizes can be provided, on which, depending on customer request, other platings or coatings can be placed. The platings or coatings should, in such case, have a thickness of at least, for instance, 1 millimeter (mm).

It is advantageous, when the first portion is manufactured of a metal, including stainless steel, tantalum or Hastelloy, a ceramic, or a chemically resistant, synthetic material, including polytetrafluoroethylene (PTFE) or perfluoroalkoxy alkane (PFA). Selected for the first portion is usually the material, of which the containment is manufactured. In case desired, however, also another material can be selected.

Likewise advantageous is when the second portion is manufactured of a fiber composite material, such as a fiber composite material having a polymer matrix, or containing a polymer. In contrast to pure synthetic materials, fiber reinforced synthetic materials provide a very much higher stiffness, or strength, as well as, in given cases, the opportunity for targeted exploitation of anisotropic properties. Likewise, the polymer matrix, the synthetic material, can be matched to the environmental conditions and, in given cases, be selected according to criteria such as chemical and/or thermal durability.

Alternatively, the second portion is composed of a metal foam, such as a foam surrounded at least partially by a polymer matrix. Metal foams exhibit besides an increased stiffness of the respective part a vibration damping, which can be advantageous for certain applications. However, also other composite materials can be used, in the case of which at least one component is a synthetic material, respectively a polymer matrix.

Advantageous is when at least the second portion is so embodied that it has a heterogeneous structure, in such a manner that in regions of the flange, which are exposed to an increased external force or an increased loading, a reinforcement is present. In the case of a fiber reinforced synthetic material, this can be accomplished, for example, on the one hand, by a targeted orientation of the fibers, however, also by density variations of the fibers, the foam or other material, within the portion.

In an additional embodiment, the synthetic material in the second portion is manufactured of a material that is a good heat insulator. This serves for thermal insulation of electronic components against increased process temperatures. The better the heat insulation in the region of the flange, the shorter can be a possible neck pipe or the like usually utilized for heat insulation.

In an embodiment, the flange is manufactured of a heterogeneous composite material, in such a manner that in at least a media-contacting region a first material is arranged, wherein in at least one environment contacting region a second material is arranged, and wherein between these two regions a heterogeneous mixture of the first and second materials with a certain gradient is arranged. This production method enables a continuous transition between the first and second portions and can offer advantages as regards the joining technology between the first and second portions.

Advantageous is when the at least one flange is welded or adhered with the at least one housing module, wherein in the housing module at least one component of an electronics unit is arranged. In such case, the housing module can be manufactured either of a synthetic material, a composite material or a metal. Some other joining technology can be selected, depending on the material of the housing module.

Finally, it is advantageous when the first and second portions are connected with one another by force and shape interlocking, including by means of an adhesive connection, a welded connection, a screwed connection, or by an injection molding or other casting process.

In an embodiment, the containment is a container, and the apparatus is a field device, which is secured to the container by means of at least one flange.

In an alternative embodiment, the containment is a pipeline, and the apparatus is a field device, which is secured to the pipeline by means of at least one flange.

In such case, advantageous is when the at least one physical or chemical process variable is the flow, the fill level, the density, or the viscosity of a medium.

A flange of the present disclosure can be produced by means of many different methods, for example, by means of an injection molding or other casting process. However, also generative methods, including 3D printing methods, provide advantageous other options.

BRIEF DESCRIPTION OF THE DRAWINGS

The present disclosure and its advantageous embodiments will now be explained in greater detail in the following based on the appended drawing, the figures of which show as follows.

DETAILED DESCRIPTION

Figure 1:
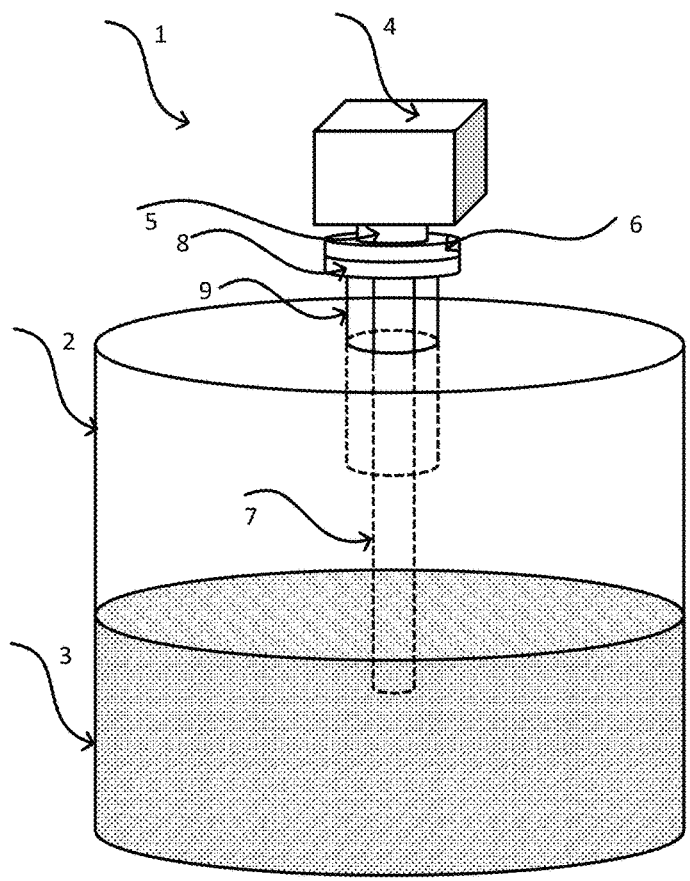
FIG. 1 shows a field device secured to a container by means of a flange.

FIG. 1 shows a field device 1 for determining and/or monitoring at least the fill level of a medium 3 in a container 2. The field device 1 includes a housing module 4, in which an electronics unit can be integrated. The housing module 4 is connected via a neck tube 5 with a flange 6. Neck tube 5 and flange 6 encircle the sensor unit 7, which is likewise connected with the housing module 4.

Container 2 is equipped with a nozzle 9, onto which a counterflange 8 is welded. Field device 1 is then connected with the container 2 by means of a flange connection between the flange 6 and the counterflange 8 in such a manner that the sensor unit 7 protrudes inwardly through the nozzle 9 at least partially into the container 2, where the sensor unit 7 is at least at times and at least partially in contact with the medium 3.

Figure 2:
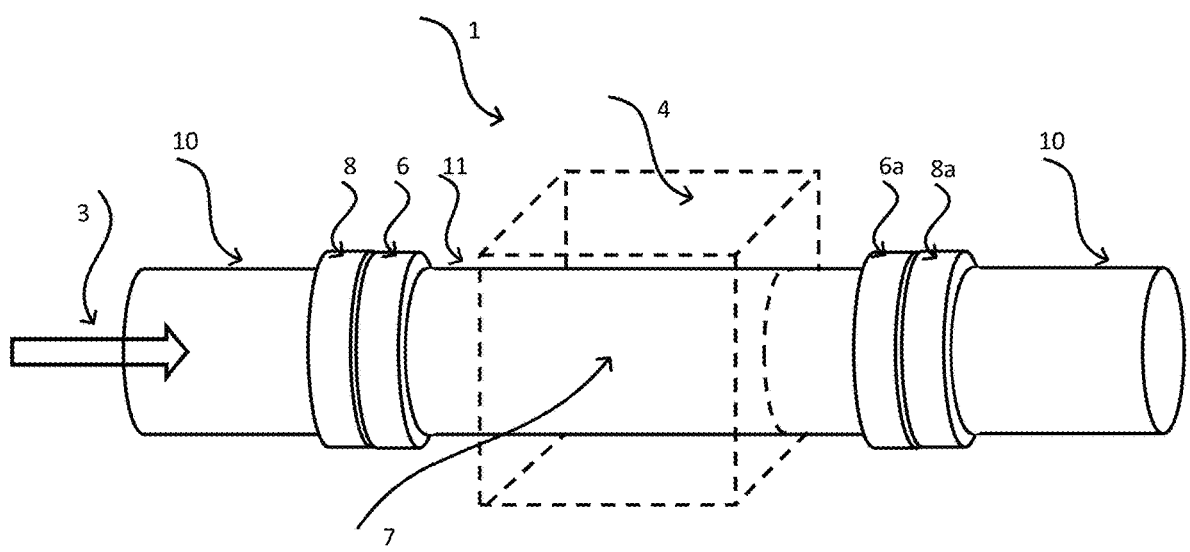
FIG. 2 shows a field device inserted into a pipeline by means of two flanges.

A further example of a field device 1 with two flanges 6, 6a is shown in FIG. 2. In this embodiment, it is a flow measuring device that is incorporated into a pipeline 10. Here, the pipeline has two counterflanges 8,8a, to which the field device 1 is connected via its two flanges 6, 6a. In the embodiment shown here, the at least one housing module 4 is arranged around a measuring tube 11. The sensor unit 7 is not drawn in detail.

In a large percentage of cases, the flanges 6, 6a for field devices 1 are manufactured of metal, since the respective containments 2, 10 are likewise often manufactured of metal. These flanges 6, 6a, especially in the case of greater nominal diameters, account for a considerable part of the weight and the manufacturing costs. This is especially true for exotic materials, such as tantalum, etc., used for special applications. By applying a hybrid flange of the present disclosure, both costs as well as also the weight fraction of the flanges can be reduced.

Figure 3:
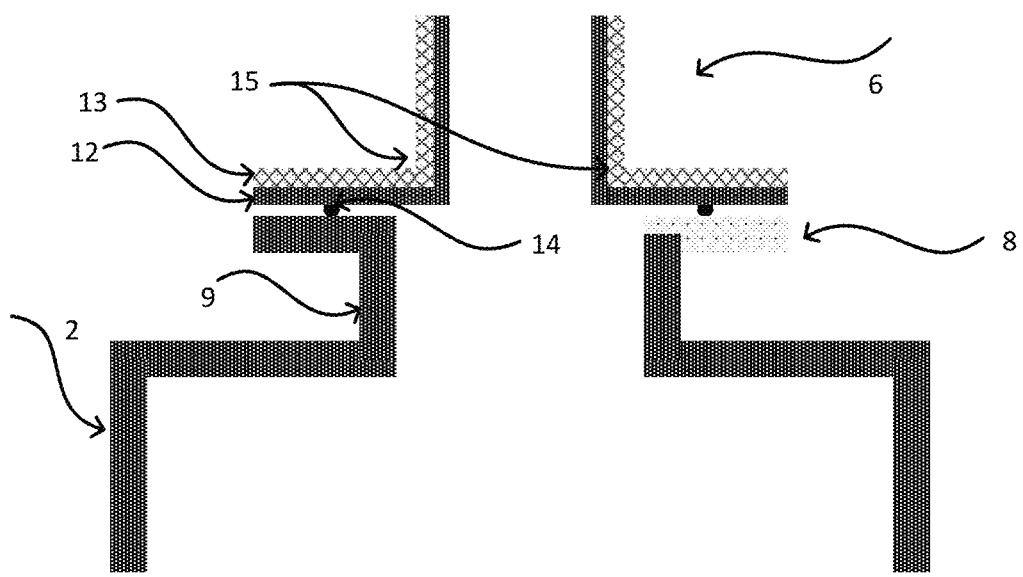
FIG. 3 shows a sectional view of a flange of the present disclosure having a first portion and a second portion.

A corresponding flange 6,6a is shown in two-dimensional view in FIG. 3. Shown is the container 2 with the nozzle 9 and the counterflange 8. The flange 6 of the field device (not shown) is a flange connected to the container 2 by means of a sealing ring 14. Flange 6 includes a first portion 12 and a second portion 13. The first portion 12 is manufactured of the same material as the container 2. First portion 12 can be, for example, a plating or a coating. The second portion 13 is manufactured at least partially of a synthetic material, e.g. a plastic, and connected by force and shape interlocking with the first portion 12.

Options for the compositions of the first and second portions 12, 13 as well as for their respective volume fractions, for joining technology, etc. include a multiplicity of variants, all of which fall within the scope of the present disclosure. The second portion 13 can, for example, be manufactured of a composite material. In regions of increased mechanical loading, such as, for example, region 15, the composite material can have, for example, reinforcements. In another variant, the materials for the first and second portions 12, 13 can also transition continuously via a gradient into one another. In this example, the material, of which the first portion 12 is manufactured, can be in the form of fibers, which are also a component of the second portion 13. Moreover, the materials for the second portion 13 and those for the at least one housing module 4 as well as, in given cases, for the neck tube 5 can be matched to one another. The region facing the environment can be so selected that it is matched optimally to the environmental parameters, for example, when a high chemical durability of the material is required. Likewise, the material in the second portion 13 can be matched to the coefficient of thermal expansion of the material used for the first portion 12.

The force and shape interlocking connection of the two portions and 12, 13 can, finally, be produced, for example, by means of weld, adhesive or screw connections. However, also injection molding or casting processes provide other options.

The invention claimed is:

1. A field device for determining and/or monitoring at least one physical or chemical process variable of a medium in a container or pipeline, comprising a sensor element, a housing module and at least one flange, wherein:
   the sensor element is configured to determine and/or monitor the at least one physical or chemical process variable of the medium;
   the sensor element and the at least one flange are connected with the housing module in assembly;
   the at least one flange includes a first portion manufactured at least partially of a first material, which is selected application specifically and/or customer specifically, the first portion embodied to at least partially contact the medium;
   the at least one flange further includes a second portion manufactured at least partially of a second material, the second portion embodied to at least partially contact the environment;
   the first material is different from the second material;
   the first portion and second portion are connected with one another by an adhesive connection, a welded connection, a screwed connection, an injection molding, a casting process, or a heterogeneous mixture of the first and second materials such that the second portion cannot contact the medium; and
   the at least one flange is configured to enable the field device to be reversibly secured to a complementary counter flange of the container or pipeline by the at least one flange with a seal therebetween.

2. The field device of claim 1, wherein the first portion is a coating or a plating disposed on or at the second portion.

3. The field device of claim 1, wherein the second material of the second portion is a thermal insulating material.

4. The field device of claim 1, wherein:
   the at least one flange is manufactured of a heterogeneous composite material such that the first material is disposed in at least a medium contacting region;
   the second material is disposed in at least one environment contacting region; and
   the first portion and second portion are connected with one another, between the media-contacting region and the environment-contacting region, by the heterogeneous mixture of the first and second materials having a gradient therebetween.

5. The field device of claim 1, wherein the at least one flange is welded or adhered to the at least one housing module, and wherein at least one component of an electronics unit is disposed in the housing module.

6. The field device of claim 1, wherein the first and second portions are connected with one another by an adhesive connection, a welded connection, a screwed connection, an injection molding, or casting process.

7. The field device of claim 1, wherein the at least one physical or chemical process variable is flow, fill level, density, or viscosity of the medium.

8. The field device of claim 1, wherein the at least one flange includes a first flange and a second flange, the second flange configured to enable the field device to be secured to a second complementary counter flange of the pipeline by the second flange with a second seal therebetween.

9. The field device of claim 1, wherein the first material is the same as the container or pipeline.

10. The field device of claim 1, wherein the second portion is opposite the medium relative to the first portion.

11. The field device of claim 1, wherein the second material is a synthetic material.

12. The field device of claim 1, wherein the first portion is manufactured of a metal or a chemically resistant, synthetic material.

13. The field device of claim 12, wherein the metal is stainless steel, tantalum or Hastelloy, and the chemically resistant, synthetic material is polytetrafluoroethylene or perfluoroalkoxy alkane.

14. The field device of claim 1, wherein the second portion is manufactured of a fiber composite material having a polymer matrix or containing a polymer.

15. The field device of claim 14, wherein at least the second portion has a heterogeneous structure such that portions of the at least one flange exposed to an external loading include a reinforcement.

16. The field device of claim 1, wherein the second portion is manufactured of a metal foam.

17. The field device of claim 16, wherein the metal foam is at least partially surrounded by a polymer matrix.

18. A field device for determining and/or monitoring at least one physical or chemical process variable of a medium in a container or pipeline, comprising at least one sensor element, at least one housing module and at least one flange, wherein:

the at least one sensor element is configured to determine and/or monitor the at least one physical or chemical process variable of the medium;

the at least one sensor element and the at least one flange are connected with the housing module;

the at least one flange includes a first portion manufactured at least partially of a first material, the first portion embodied to at least partially contact the medium;

the at least one flange includes a second portion manufactured at least partially of a second material, the second portion embodied to at least partially contact the environment;

the at least one flange is manufactured of a heterogeneous composite material such that the first material is disposed in at least a medium contacting region and the second material is disposed in at least one environment contacting region;

the first material is different from the second material;

the first portion and second portion are connected with one another, between the media-contacting region and the environment-contacting region, by the heterogeneous mixture of the first and second materials having a gradient therebetween; and wherein the field device is secured to the container or pipeline by the at least one flange with a seal therebetween.

19. The field device of claim 18, wherein the at least one flange includes a first flange and a second flange, the second flange configured to enable the field device is to be secured to a second complementary counter flange of the pipeline by the second flange with a second seal therebetween.

* * * * *